United States Patent [19]

Erickson

[11] Patent Number: 5,484,073
[45] Date of Patent: Jan. 16, 1996

[54] METHOD FOR FABRICATING SUSPENSION MEMBERS FOR MICROMACHINED SENSORS

[75] Inventor: Raymond K. Erickson, Taylor, Tex.

[73] Assignee: I/O Sensors, Inc., Austin, Tex.

[21] Appl. No.: 218,363

[22] Filed: Mar. 28, 1994

[51] Int. Cl.$^6$ .................................. H01L 21/306
[52] U.S. Cl. .................... 216/2; 216/79; 216/99; 437/901; 148/DIG. 12
[58] Field of Search ................ 148/D159, D12; 257/418, 419; 437/901, 228; 156/643, 647, 657, 662; 73/517 R; 216/2, 79, 99

[56] References Cited

U.S. PATENT DOCUMENTS

| | | | |
|---|---|---|---|
| Re. 31,459 | 12/1983 | Block | 338/47 |
| 4,021,766 | 5/1977 | Aine | 338/2 |
| 4,106,976 | 8/1978 | Chiou et al. | 156/644 |
| 4,144,516 | 3/1979 | Aine | 338/2 |
| 4,597,003 | 6/1986 | Aine et al. | 156/657 |
| 4,670,092 | 7/1987 | Motamedi | 156/643 |
| 4,679,434 | 7/1987 | Stewart | 73/517 |
| 4,732,647 | 3/1988 | Aine | 156/647 |
| 4,805,456 | 2/1989 | Howe et al. | 73/517 |
| 4,922,756 | 5/1990 | Henrion | 73/517 R |
| 5,000,817 | 3/1991 | Aine | 156/662 |
| 5,006,487 | 4/1991 | Stokes | 437/228 |
| 5,195,371 | 3/1993 | Greiff | 73/505 |
| 5,233,213 | 8/1993 | Marek | 257/419 |
| 5,324,688 | 6/1994 | Kondo | 437/901 |

FOREIGN PATENT DOCUMENTS

| | | |
|---|---|---|
| 63-76483 | 4/1988 | Japan . |
| 1301181 | 12/1989 | Japan . |
| 2218172 | 8/1990 | Japan . |

OTHER PUBLICATIONS

E. Stemme & G. Stemme, "A Balanced Dual-Diaphragm Resonant Pressure Sensor in Silicon", IEEE Transactions on Electron Devices, vol. 37, No. 3, Mar. 1990, pp. 648–652.

Proceedings of the IEEE, vol. 70, No. 5, May, 1982, Petersen, Kurt E., *Silicon as a Mechanical Material.*

Proceedings of the IEEE, vol. ED-25, No. 10, Oct. 1978; Bassous, Ernest; *Fabrication of Novel Three-Dimensional Microstructures by the Anistropic Etching of (100) and (110) Silicon.*

Scientific American, Apr. 1983; Angell, James B., Terry, Stephen C., and Barth, Phillip W.; *Silicon Micromechanical Devices.*

IEEE Publication 0018-9383/79/1200–1911, 1979; Roylance, Lynn M. and Angell, James B.; *A Batch-Fabricated Silicon Accelerometer.*

IEEE Publication CH2783-9/90/0000–0153, 1990; Henrion, Wo, DiSanza, Len; Ip, Matthew; Terry, Stephen; & Jerman, Hall; *Micro-Machined Accelerometer.*

*Primary Examiner*—George Fourson
*Assistant Examiner*—Thomas G. Bilodeau
*Attorney, Agent, or Firm*—Bush, Moseley, Riddle & Jackson

[57] ABSTRACT

A method for fabricating a connecting spring member (24) of an arbitrary shape extending between a central mass (21) and an outer support frame (23) of a sensor as shown in FIG. 7 is disclosed. Each of a pair of generally identical silicon wafers (10, 12) has an inner etch stop layer (16) applied to one face with an outer epitaxial layer (18) formed over such etch stop layer (16). A photosensitive oxide layer (30) is applied to the other face of each of the wafers (10, 12). Next, a pattern of the central mass (21) and outer support frame (23) as shown in FIG. 2 is photographically imposed on the photosensitive oxide layers (18) of each wafer (10, 12). After wet chemical etching of the wafers (10, 12) removes silicon material to the etch stop layer, and the etch stop layer is itself removed in the space between the mass and the frame, the two wafers (10, 12) are bonded to each other as shown in FIG. 5. Next, the spring shape, of any arbitrary shape is formed by plasma etching from the outer surfaces of the bonded wafers (10, 12) in the area between the mass and the frame. Accordingly the spring members (24) extend between the central mass (21) and the outer support frame (23).

9 Claims, 2 Drawing Sheets

METHOD FOR FABRICATING SUSPENSION MEMBERS FOR MICROMACHINED SENSORS

BACKGROUND OF THE INVENTION

1. Field of the Invention

This invention relates generally to a method for fabricating a sensor, and more particularly to a bulk silicon micromachining process for fabricating a sensor having a mass suspended from a support frame by high precision suspension springs.

2. Description of the Prior Art

Silicon is a material having highly desirable mechanical properties. Single-crystal or monocrystalline silicon is harder than most metal and is surprisingly resistant to mechanical stress. In both tension and compression, silicon has a higher elastic limit than steel and remains strong under repeated cycles of tension and compression below its elastic limit. So-called micromachining processes allow silicon to be made into mechanical devices of extremely small size allowing miniaturization of such devices in much the same way as has been the miniaturization of electronic devices such as computer chips, etc. Micromachining processes allow many devices to be fabricated at the same time so that the cost per device is low where many devices are fabricated. Micromachined devices are uniform in quality, because the same processing steps operating on a device on one side of a silicon wafer are the same as those on other parts of the wafer.

Micromachining normally utilizes chemical etching techniques for forming three dimensional shapes, such as pits, holes, trenches or walls. Micromachining usually begins with photolithography, a photographic technique used to transfer copies of a master pattern onto the surface of a silicon wafer. The first step is to grow a thin layer of oxide on the wafer surface by heating it to between 800 C. and 1200 C. in an atmosphere of steam. Then, a photoresist, a thin layer of an organic polymer sensitive to ultraviolet radiation, is deposited on the oxide surface, and exposed and developed. A pattern of bare and photoresist coated oxide is formed on the wafer surface. After subsequent treatment with acid, the oxide is etched away while the photoresist coated oxide remains. The final result is a pattern of oxide on the wafer surface that duplicates the photoresist pattern.

The oxide pattern may serve as a mask during the doping of the wafer with impurities, such as boron or phosphorous. The oxide pattern is also used as a mask during chemical or anisotropic etching with the etching material attacking the silicon. Anisotropic etchants, which are also known as orientation-dependent, etch at different rates in different directions in the silicon crystal lattice and can form well defined shapes with sharp corners and edges.

Acceleration sensors, motion sensors and pressure sensors are examples of devices fabricated by micromachining. There are many others. Examples of micromachined acceleration sensors include the piezosensitive and capacitive types.

Sensors may include a central sensing mass supported within an outer support frame for relative movement by one or more suspension members extending between the mass and the outer support frame. Suspension members heretofore have comprised suspension springs, beams, hinges, or diaphragms to support the sensing mass with respect to the outer support frame. Such suspension members have been micromachined heretofore using a wet anisotropic etch, for example.

U.S. Pat. No. 4,922,756 dated May 8, 1990 shows a micromachined accelerometer fabricated from silicon by batch photolithographic techniques from a monocrystalline wafer. The accelerometer includes E-shaped leaf springs fabricated from silicon dioxide. The top silicon spring faces of the E-shaped springs on each side of the wafer are masked, and silicon dioxide is grown on surfaces that are later patterned and etched away by an chemical etching. A thin photoresist or stop layer is formed. A thick oxide layer is then grown by diffusing a precise amount of oxygen into the silicon to form a precise thickness of silicon dioxide on the wafer. Next, the opposite surfaces of the wafer are masked exposing selected areas which are etched down to the silicon surfaces. A thin silicon dioxide layer is then grown, masked, and the exposed silicon dioxide etched down to the silicon surface exposed to the silicon etchant. A chemical etch of the silicon material is then applied which acts through openings of the silicon dioxide to etch silicon material away while undercutting the legs of the E-shaped springs. Stiff etched stop layers remain for the bases of the springs and the opposite faces of the suspended mass and support structures. Force and sense conducting areas are then deposited on opposite faces of the suspended mass and on complementary force and sense conducting areas of the opposing support structures. Thus, three dimensional E-shaped springs are provided with the length of each leg and its thickness accurately controlled to control the spring constant of the sensing member.

U.S. Pat. No. 4,144,516 dated Mar. 13, 1979 is directed to a leaf spring sensor or transducer fabricated by batch photolithographic etching techniques from a monocrystalline silicon material. Two separate wafers are formed with an array of spring structures therein. Each wafer includes electrical circuitry on a top surface with the bottom surface etched with an anisotropic etchant to define an E-shaped leaf spring structure and surrounding supporting structure. Then, the two wafers are joined together such as by adhesive, soldering, or brazing to form a dual spring sensor or transducer. Individual transducers are then separated from the joined wafers and subsequently mounted to a suitable support structure.

Both of the spring systems described above include E shaped springs. The prior art of semi-conductor micromachining includes spring and suspension members having straight lines which are characteristic of the chemical etching process along crystallographic planes of diamond cubic materials such as silicon. The creation of spring geometries by chemical etching of silicon material accordingly is limited as to the shapes of spring and suspension members which can be micromachined.

IDENTIFICATION OF OBJECTS OF THE INVENTION

It is an object of this invention to provide a method for fabricating three dimensional mechanical structures of an arbitrary shape for sensors by micromachining of silicon.

Another object of this invention to provide such a method for the fabrication of springs for a support member-spring-mass structure in which a single spring or a superjacent pair of arbitrary shape are provided between the mass and the surrounding support member.

A further object of the invention is to provide an etching process for fabrication of high precision suspension springs between a support frame and a suspended mass in which an arbitrary shape may be achieved of the top and bottom surfaces of the suspended mass and of the springs.

Another object of the invention is to provide a micromachining process for a frame-spring-mass structure characterized by extremely good control over the thickness of the resulting springs.

Another object of the invention is to provide a micromachining process for a support member-spring-mass structure which facilitates "tuning" of the springs by:

(1) shaping the springs to eliminate stress;

(2) shaping the springs to maximize linearity;

(3) coating the springs to form preloading conditions; and (4) doping of the springs to form preloaded conditions.

SUMMARY OF THE INVENTION

The objects identified above, along with other advantages and features of the invention are realized in a new process for micromachining a support member-spring-suspended mass structure. The invention is particularly directed to a process for fabricating an outer surface of the suspended mass and the springs in arbitrary planar shapes and for fabricating the springs with arbitrary thickness. In its most general form, this invention is directed to fabrication of a single silicon wafer to produce such arbitrary shapes of the outer surface of the suspended mass and springs.

In its preferred embodiment, the process invention disclosed herein comprises providing two identical silicon wafers, with one wafer, after processing forming the upper half of the suspended mass and surrounding support frame, and the other wafer forming the lower half of the mass and surrounding support frame. Each wafer includes a bulk silicon layer having on its upper surface an etch stop layer beneath an upper epitaxial (EPI) layer grown on top of the buried etch stop layer. The etch stop layer is preferably a P++ layer. (Such etch stop layer could be a buried oxide $SiO_2$ layer). A P++ layer is a thin layer of silicon in which P-type impurities such as Boron are added such that the semi-conductor is characterized by an excess mobile hole concentration which is very, very large. A photosensitive oxide layer is provided on the bottom silicon surface of each wafer. A "photosensitive oxide layer" for the purposes of this specification is an oxide layer on which photoresist material has been disposed.

Next, a pattern of the central mass and outer support frame is exposed on the photosensitive oxide layer on the bottom surface of each of the wafers. The oxide layer pattern of the frame and suspended mass remain after the exposed photoresist area between frame and mass has been removed. An etching chemical is then applied to the bottom surface of each wafer. Such chemical etches through the pattern which represents the space between the desired frame and the suspended mass. Etching of the silicon layer stops at the P++ or buried oxide etch stop layer. The etching for the silicon layer is accomplished with a wet etching material, an anisotropic etchant such as aqueous potassium hydroxide (KOH) or aqueous sodium hydroxide (NaOH). The anisotropic etchant, if properly employed, does not undercut the oxide layer and forms well defined side walls.

The exposed P++ layer is then etched away with a wet etchant in the areas which will frame the springs between the mass and the outer support frame. The thickness of the springs is controlled by controlling the thickness of the EPI material which remains. Next, the two wafers or wafer halves are bonded to each other so that the epitaxial (EPI) layers are on the upper and lower surfaces or faces of the bonded wafers. The EPI layers are the only layers remaining in the area for the springs between the mass and the outer support frame for the mass. The spring shape connecting the outer frame and the suspended mass is patterned on the top and bottom EPI surfaces. The spring shape is formed via the patterns of the EPI surfaces with a dry plasma etch.

An arbitrary shape of the springs is thus formed by dry etching according to the pattern applied to the top and bottom halves of the EPI layers. After fabrication of the center mass and outer support frame from the two bonded wafers, upper and lower cover plates or caps are fabricated from separate wafers. Such cover plates then bond to the outer support frame with suitable complementary electrodes forming a common sensing/conducting area or separate sensing and conducting areas on the center mass and the top and bottom cover plates such as illustrated in U.S. Pat. No. 4,922,756, the entire disclosure of which is incorporated herein.

BRIEF DESCRIPTION OF THE DRAWINGS

The objects, advantages, and features of the invention will become more apparent by reference to the drawings which are appended hereto and wherein like numerals indicate like parts and wherein an illustrative embodiment of the invention is shown, of which.

DESCRIPTION OF THE INVENTION

Figure 1:
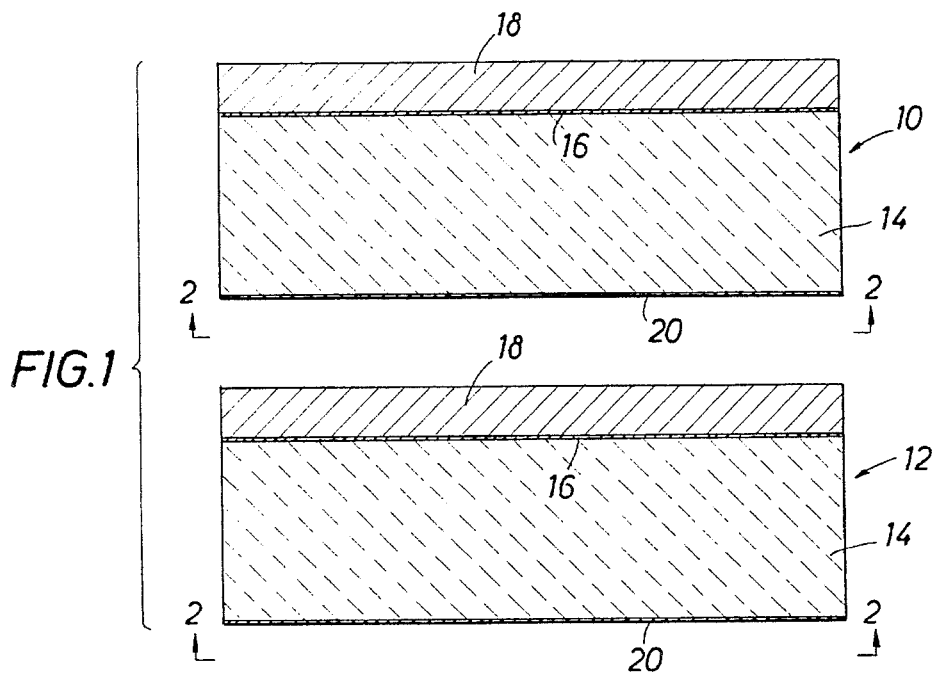
FIG. 1 is a sectional view of a pair of identical silicon wafers for forming top and bottom halves of a central mass and outer support frame fabricated in accordance with the micromachining fabricating method of the present invention.

The method for fabricating a sensor or accelerometer by batch etching techniques from a monocrystalline silicon material is illustrated by the sequential steps set forth in the drawings. The micromachining fabrication process utilizes chemical etching techniques followed by dry plasma etching for forming arbitrary three-dimensional shapes for springs or connecting members which extend between a central mass and an outer support frame of the sensor. The sensor formed by the present invention is directed particularly to a micromachined structure sensitive to acceleration which is fabricated from silicon by batch photolithographic techniques. The sensor is preferably formed of four separate wafers with two wafers bonded together to form the central mass and surrounding outer support structure, while the remaining two wafers define outer plates or covers bonded to the surrounding support frame. Alternatively, the central mass-springs-surrounding outer support structure may be fabricated from a single wafer.

Referring to the preferred process embodiment of the invention of FIGS. 1-6 and beginning with FIG. 1, two identical wafers indicated generally at 10 and 12 are shown. Wafer 10 provides the processed construction material to form the upper half of a central mass and surrounding support frame, while wafer 12 provides the processed construction material to form the lower half of the central mass and surrounding support frame. The upper and lower halves are identical and for example, may be of around 500 microns in thickness. Each wafer 10, 12, includes a layer of silicon shown at 14 and has on its upper surface preferably a P++ (but alternatively a buried oxide) etch stop layer 16 thereon which, for example, may be about 14 microns in thickness. Such etch stop layer has been processed to form a rich layer of Boron impurities diffused in silicon. An upper epitaxial (EPI) layer 18 is grown on the top of the covered etch stop layer 16. A bottom photosensitive oxide layer (formed by thermal oxidation) is provided at 20 on the bottom or lower surface of each wafer 10, 12. The term "photosensitive oxide layer 20" as used herein is a thin layer of silicon oxide 25 on which photoresist has been applied.

Figure 2:
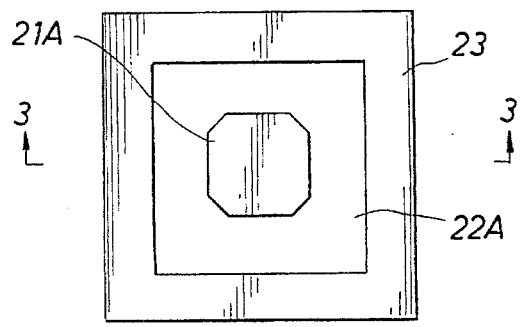
FIG. 2 is a plan view of a pattern for the mass and outer support frame which is photographically imposed on photosensitive oxide layers of the top and bottom halves shown in FIG. 1.

Next, a pattern of a central mass and outer support frame is masked from exposure as shown generally in FIG. 2 with the central mass shown at 21A and the outer support frame shown at 23A. The pattern shown in FIG. 2 is exposed and developed on the photoresist covered oxide layers 20 of upper wafer 10 and lower wafer 12. The corners of the mass pattern (as illustrated) and of the support frame (not illustrated) may be compensated, that is provided with a short straight edge from side to side, so as to eliminate subsequent overetching in sharp corners. The photoresist material of space 22A between the mass 21A and the frame 23A is removed by a suitable etch, such as 6:1 BOE etch. The mass region 21A and the frame region 23 are protected by unexposed photoresist.

Figure 3:
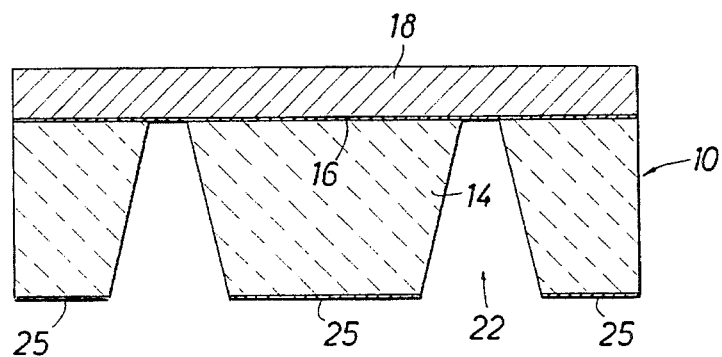
FIG. 3 is a sectional view illustrating another step in the fabricating process of this invention in which a wet chemical etching material is applied through patterns of removed oxide layers for etching through the silicon layer of each wafer to an etch stop layer.

A wet etching chemical material, such as potassium hydroxide (KOH) (33% by weight) is then applied to the surface 22A of layer 20 of each wafer 10, 12. Etching occurs through silicon layer 14 to the etch stop layer 16 formed by the P++ etch stop material as illustrated in FIG. 3. Only the top wafer 10 is shown in FIG. 3. The lower half of wafer 12 is formed in a similar manner. The (KOH) chemical etch removes the silicon from layer 14 in a void area 22 to a level preferably of about 450 microns deep. The wafer is rinsed in water. Chemical etching is then continued with $C_5OH$ etch (60% by weight) which exposes etch stop layer 16 in the areas provided for patterning of the springs beneath the upper epitaxial (EPI) layer 18. The anisotropic etching forms well defined side walls for the void areas 22 formed between the central mass and the outer support frame.

Figure 4:
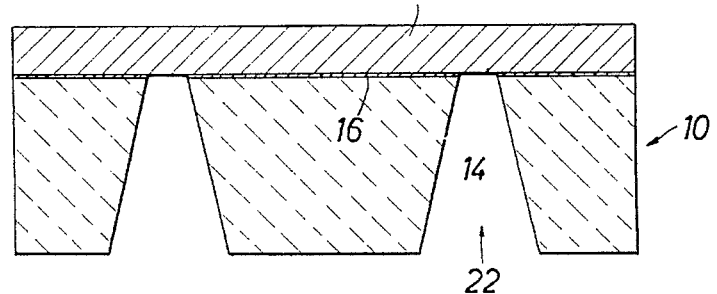
FIG. 4 illustrates a further step in the fabricating method of this invention in which an etch stop layer of each wafer, where springs are to be formed, is etched away with a wet chemical etching material leaving an upper epitaxial (EPI) layer of controlled thickness on the top of each of the wafers.

Next, a preferential wet etch mixture (preferably 8:3:1 CH3COOH:HNO3:HF), is applied for a controlled short time against the exposed P++ layer 16 in the areas which will form the springs between the central mass and the outer support frame as shown particularly in FIG. 4. The amount of removal of the P++ layer and the EPI layer above it controls the thickness of the resulting springs. The thin oxide strip layer 25 (FIG. 3) is removed with a suitable etching material (preferably 6:1 BOE).

Figure 5:
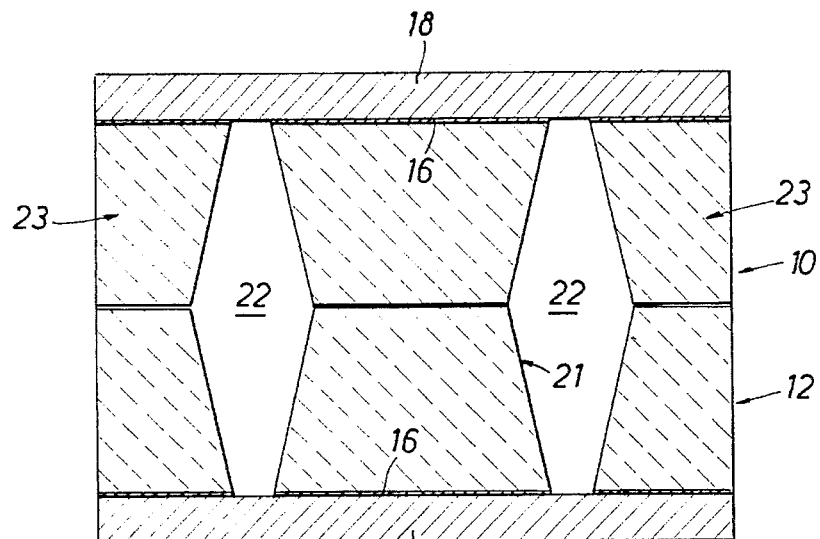
FIG. 5 illustrates the next step in the fabricating method of this invention in which the two wafers are bonded together to form the central mass and surrounding support frame with each wafer having an outer epitaxial layer thereon with the etch stop layer in the area for the springs etched away.

Next, wafers 10 and 12 are fusion bonded to each other as shown in FIG. 5 so that the epitaxial (EPI) layers 18 are on the upper and lower surfaces of the bonded wafers 10 and 12 which form the bonded halves of the central mass and surrounding support frame. Thus, the EPI layers 18 are the only layers now remaining in the area for the springs between the mass and the outer support frame for the mass. Next, surfaces 18' are metalized with 100 Å Cr and 1000 Å Au and baked. The pattern for the springs 24 is then applied with photoresist onto top and bottom metalized surfaces 18'.

Figure 6:
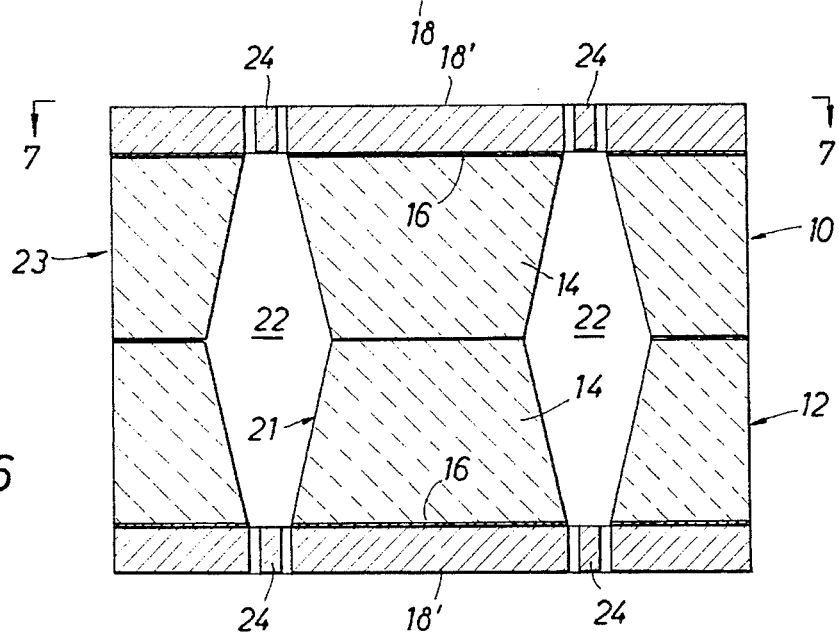
FIG. 6 illustrates the next step in the fabricating process in which dry plasma etching processes are used to etch through a pattern of the upper and lower epitaxial layers of the wafers in the areas where the etch stop layer has been removed for forming the shape of springs between the central mass and the outer support frame for the central mass.

Next, as shown in FIG. 6, resilient connecting members or springs 24 are formed between the central mass and the outer support frame by a dry plasma etch step from the top and bottom surfaces of the bonded halves 10, 12 through patterns created on metalized surfaces 18' of the epitaxial (EPI) layers 18. The dry etching is provided to top and bottom surfaces 18' with a plasma etch such as a silicon etch $SF_6$ (380 m Torr. 175 watts) to remove silicon beneath the pattern followed by an oxygen plasma strip (300 watts 400 m Torr.) to remove photoresist. Plasma etching removes EPI material of layer 18 between the spring 24 and the adjacent frame 23 and the adjacent proof mass 21, etc.

Figure 7:
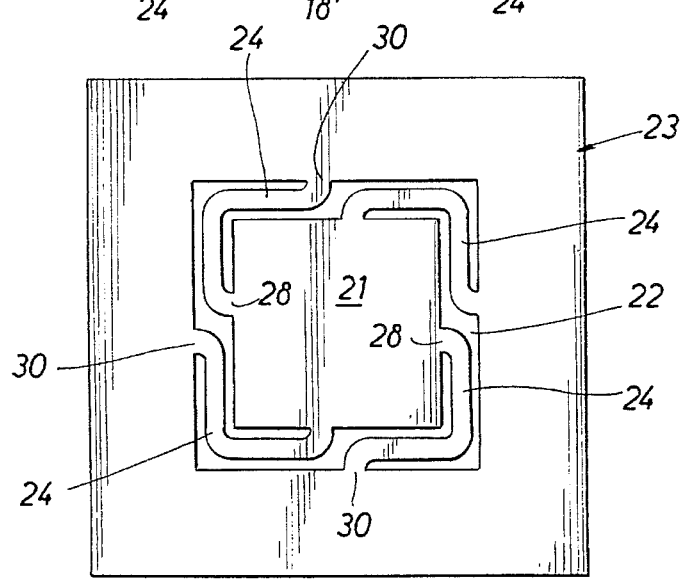
FIG. 7 is a top plan view of a central mass and outer support frame having the connecting spring members therebetween as formed in accordance with the fabrication method of the present invention.

After the formation of springs 24, the bonded halves as shown in FIG. 7 define central mass 21 suspended by springs 24 extending between central mass 21 and outer support frame 23. Springs 24 as shown in FIG. 7 comprise superjacent pairs of L-shaped springs extending about the corners of the generally rectangular mass 21. Top and bottom surfaces 21 of mass 14 are preferably square or rectangular in shape, but they may be multi-sided, even circular in shape. Inner ends 28 of springs 24 are secured to adjacent sides of mass 21. Opposite outer ends 30 of springs 24 are secured to adjacent sides of an outer support frame 23. The sides of mass 21 are joined at corners which may be rounded, if desired. For further details of the preferred shape of suspension springs 24, reference is made to copending application Ser. No. 08/218,525 filed Mar. 28, 1994 entitled Sensor Structure With L-Shaped Spring Legs, the entire disclosure of which is incorporated herein.

To complete the sensor, suitable conducting areas forming a sensing/conducting area or separate sensing and conducting areas (not shown) are provided on central mass 21. Opposed upper and lower caps or plates (not shown) are bonded to the upper and lower surfaces of mass 21 and outer support frame 23 as well known. For further details on the formation of such electrical sense and conducting areas, and the measuring of the deflection or distortion in springs 24 upon relative movement of mass 21, reference is made to the aforementioned U.S. Pat. No. 4,922,756. Where desired, a single conducting area used both as a sensing and conducting plate may be used in combination with time multiplexing circuitry.

Table I below presents preferred steps of the inventive process for fabricating the light spring structure as illustrated in FIGS. 1–7. For completeness, steps relative to providing alignment holes in the top and bottom wafers are mentioned. Likewise, steps for providing electrical contact on mass surfaces via springs are also mentioned.

TABLE I

| STEP | |
|---|---|
| 1 | Provide 4", 100 silicon wafer, double sided polished: 500 microns thick. |
| 2 | Grow EPI layer to 500 oxide microns thick. |
| 3 | Thermal oxidize wafer alternating with dry, wet and dry conditions to provide .3 microns layer. |
| 4 | Spin wafer on EPI side. Hardbake EPI side on a hotplate. |
| 5 | Spin wafer on backside; softbake backside on hot plate. (If lateral vents are not desired go to step 12). |
| 6 | Pattern backside with lateral vents mask using lateral vents masks. |
| 7 | Apply 6:1 BOE Etch; then strip photoresist from backside and RCA clean. |
| 8 | Thermal oxidize wafer alternating with dry, wet and dry conditions to provide 3 micron layers. |
| 9 | Deposit nitride to .15 micron thick using LPCVD Nitride. |
| 10 | Spin wafer on EPI side and hardbake it on hotplate. |
| 11 | Spin wafer on backside and softbake it. |
| 12 | Pattern with photoresist the backside of wafer using ODE Cavity Mask (per FIG. 2). |
| 13 | Plasma etch; Nitride etch 380 in Torr, 175 watts, SF6. |
| 14 | Wet etch; 6:1 BOE; strip photoresist. |
| 15 | Wet etch: KOH etch (33 wt %) to 450 microns deep; Deionized Water (DI H$_2$O) rinse. |
| 16 | Wet etch: C$_5$OH etch (60%) to P + + etch stop; DI H$_2$O rinse. |
| 17 | Preferential etch of P + + (8:3:1 CH3COOH:HNO3:HF) using dropper in alignment holes only (alignment holes not illustrated in drawing Figures; alignment holes are used to align wafers for fusion bonding of masses). |
| 18 | Wet etch: KOH etch (33 wt %) until light is clear in alignments. DI H$_2$O rinse. |
| 19 | Wet etch entire wafer of P + + layer; (8:3:1 CH3COOH:HNO3:HF). |
| 20 | Remove brown stain (porous silicon) using 97:3 HNO3:HF; DI H$_2$O rinse. |
| 21 | Strip nitride with backing phosphoric, strip oxide in 6:1 BOE. |
| 23 | RCA clean. |
| 24 | Fusion bond mass portion of two wafers together; align. |
| 25 | Oxidize with wet O$_2$ to close vents. |
| 26 | Wet etch: BOE to remove oxide, DI H$_2$O rinse, spin dry. |
| 27 | Metalize with 100 ÅCr, 1000 ÅAu on both sides. |
| 28 | Spin on both sides; then softbake. |
| 29 | Pattern both sides with photoresist using metal washes representative of spring shape. |
| 30 | Au etch, Cr etch. |
| 31 | Spin on both sides, softbake. |
| 32 | Pattern front side in the photoresist with spring and electrical contact masks; hardbake. |
| 33 | Plasma etch: Silicon plasma etch (380 in Torr., 175 watts) both sides. |
| 34 | Plasma etch: O$_2$ plasma strip (400 m Torr) both sides. |

From the above, it is apparent that springs 24 of a predetermined arbitrary shape and thickness can be provided by the fabricating method of the present invention from batch etching techniques using processed monocrystalline silicon wafers. Springs 24 as illustrated herein may be of a generally L-shape with rounded corners where attached to support frame 23 and mass 14. The L-shape springs (such spring shape can also be characterized as an "elbow" shape) fit about a generally rectangular, (or other shape as described above) mass, but such suspension members or springs may be formed of various shapes and sizes in accordance with the present invention.

While a preferred embodiment of the present invention has been illustrated in detail, it is apparent that modifications and adaptations of the preferred embodiment will occur to those skilled in the art. As discussed above, the inventive process described herein may be used to make sensors of different forms. A sensor fabricated with four (or even two or three springs) with a simple wafer may be employed. Such modifications and adaptations are within the spirit and scope of the present invention as set forth in the following claims.

What is claimed is:

1. A method of fabricating connecting members for suspending a mass within an outer support frame of a sensor for movement relative to said outer support frame; said method comprising:

providing a pair of generally identical silicon wafers each having a body with opposed faces and adapted to form halves for said outer support frame, mass, and connecting members;

forming on a first face of each silicon wafer an inner etch stop layer, thereby creating an etch stop layer over a silicon layer;

forming on said first face of each wafer an outer epitaxial layer over said etch stop layer;

forming a pattern on a second face of each silicon wafer which defines a pattern space between a pattern for the outer support frame and said mass;

chemically etching said silicon layer through said pattern space of said second face of each wafer with a wet etching material to form an opening therein extending to said etch stop layer and in accordance with said imposed pattern;

chemically etching said etch stop layer of each wafer so as to remove said etch stop layers in said areas defined for said connecting members;

bonding said wafers to each other to define said mass and said outer support frame with said epitaxial layers being on the outer surfaces of said bonded wafers; and dry etching from an outer surface of at least one of said bonded wafers in the area of the removed etch stop layer to form said connecting members between said mass and said outer support frame.

2. A method as set forth in claim 1 wherein said step of dry etching comprises:

plasma etching from each outer surface of said bonded wafers to form superjacent pairs of connecting members between said mass and said outer support frame.

3. A method as set forth in claim 2 wherein said step of dry etching comprises:

plasma etching to form connecting members of a generally L-shape extending about corners of a generally rectangular mass.

4. A method of fabricating a sensor including an outer support frame and a mass therein suspended by spring members from the outer support frame, said method comprising the steps of:

providing a pair of generally identical silicon wafers each having a pair of opposed faces and adapted to form halves for said outer support frame, mass, and spring members;

forming on one face of each silicon wafer an inner etch stop layer;

forming on said one face of each wafer an outer epitaxial layer over said etch stop layer;

forming a pattern on the other face of each wafer in order to define a patterned space between an outer support frame and said mass chemically etching said silicon wafer from said other face of each wafer with a wet etching material through the patterned space between the outer support frame and said mass to form an opening therein extending to said etch stop layer;

chemically etching said etch stop layer on each wafer so as to remove said etch stop layer in said space between said outer support frame and said mass;

bonding said wafers to each other to define said mass and said outer support frame such that said epitaxial layers are on the outer surfaces of said bonded wafers; and dry etching from at least one outer surface of said bonded wafers in said space between said mass and said outer support frame to form said spring members between said mass and said outer support frame.

5. The method as set forth in claim 4 wherein the step of dry etching comprises:

dry etching of both outer surfaces of said bonded wafers in said space between said mass and over the areas of the removed said etch stop layer to form upper and lower aligned pairs of spring members between said mass and said outer frame.

6. A method of micromachining one or more suspension members between a frame member and a suspended mass, said frame member and said suspended mass having side walls, comprising:

processing a silicon wafer to produce a processed wafer including a layer of bulk silicon and a layer of epitaxial grown silicon separated by an etch stop layer;

from the bulk silicon side of said processed wafer, first chemically etching said layer of bulk silicon according to a pattern defining the space between said side walls of said frame member and said suspended mass, said etching stopping at said etch stop layer;

then later chemically etching from said bulk silicon side of said wafer for preferentially removing said etch stop layer from said space between said side walls of said frame member and said suspended mass, thereby providing a layer of epitaxial silicon adjacent said space between said side walls of said frame member and said suspended mass; and dry etching from said epitaxial grown silicon side of said processed wafer according to a suspension member pattern of arbitrary shape to remove epitaxial grown silicon material in said space thereby leaving one or more suspension members which suspend said mass from said frame member.

7. The method of claim 6 wherein said later chemically etching step is performed for a controlled time not only to remove said etch stop layer but also to remove a portion of said layer of epitaxial silicon adjacent said space between said side walls of said frame member and said suspended mass so as to control the thickness of the epitaxial silicon which remains.

8. The method of claim 6 wherein said dry etching step includes the step of patterning said epitaxial grown side of said processed wafer with a suspension member having an L-shape having two intersecting legs with rounded corners at the attachment of one leg to said frame member and at the attachment of the other leg to said suspended mass and at the intersection of two legs of said L-shape member.

9. A method of micromachining one or more suspension members between a frame member and a suspended mass, said frame member and said suspended mass having side walls, the method comprising the steps of:

processing a silicon wafer to produce a processed wafer including a layer of bulk silicon and a layer of epitaxial grown silicon separated by an etch stop layer;

from the bulk silicon side of said processed wafer, chemically etching said layer of bulk silicon and said etch stop layer to leave a thickness of epitaxial silicon according to a pattern defining the space between said side walls of said frame member and said suspended mass; and dry etching from said epitaxial grown silicon side of said processed wafer according to a suspension member pattern of arbitrary shape to remove epitaxial grown silicon material in said space thereby leaving one or more suspension members which suspend said mass from said frame member.

* * * * *